April 1, 1952  J. H. CLARK  2,591,510
CITRUS FRUIT PRESS

Filed March 25, 1949 4 Sheets-Sheet 1

INVENTOR.
Jesse H. Clark
BY

April 1, 1952     J. H. CLARK     2,591,510
CITRUS FRUIT PRESS

Filed March 25, 1949     4 Sheets-Sheet 2

INVENTOR.
Jesse H. Clark
BY

April 1, 1952 J. H. CLARK 2,591,510
CITRUS FRUIT PRESS
Filed March 25, 1949 4 Sheets-Sheet 3
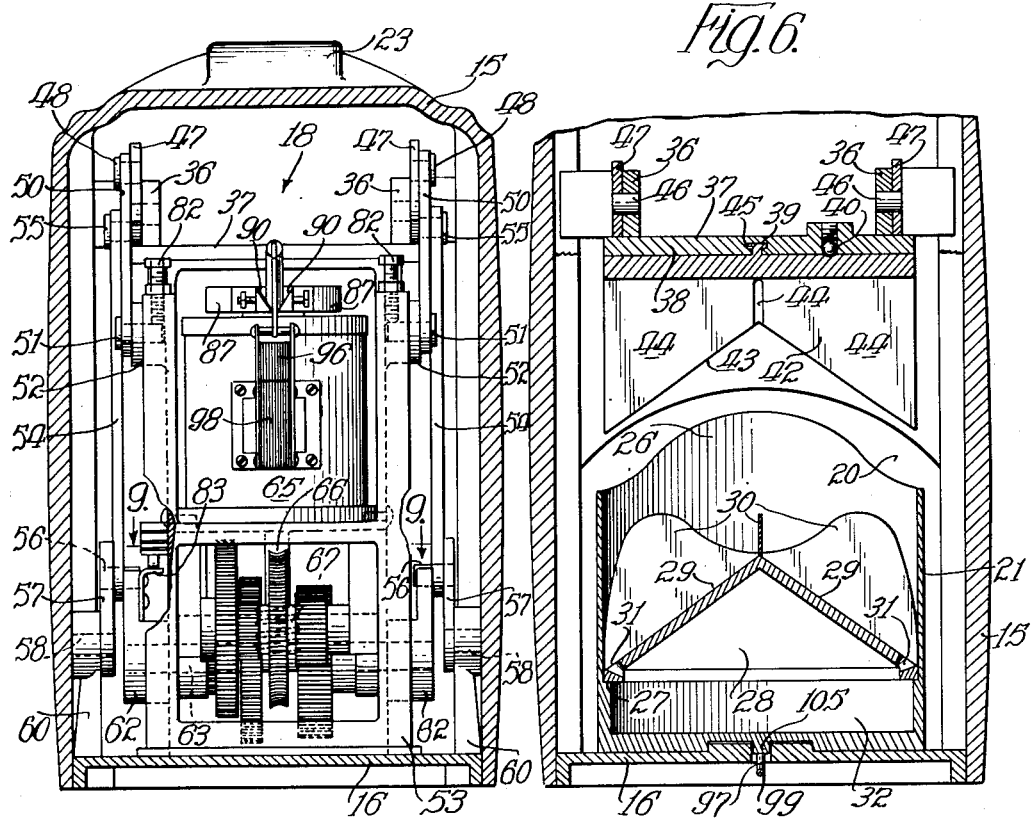
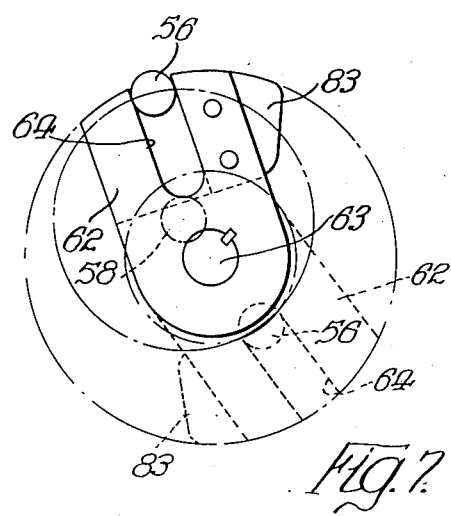
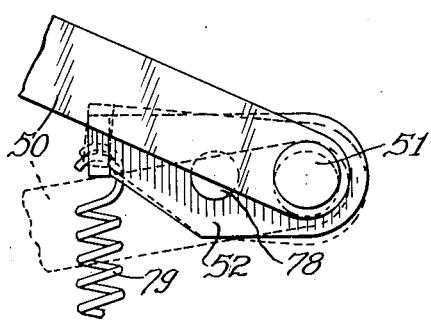
INVENTOR.
Jesse H. Clark
BY April 1, 1952 J. H. CLARK 2,591,510
CITRUS FRUIT PRESS
Filed March 25, 1949 4 Sheets-Sheet 4
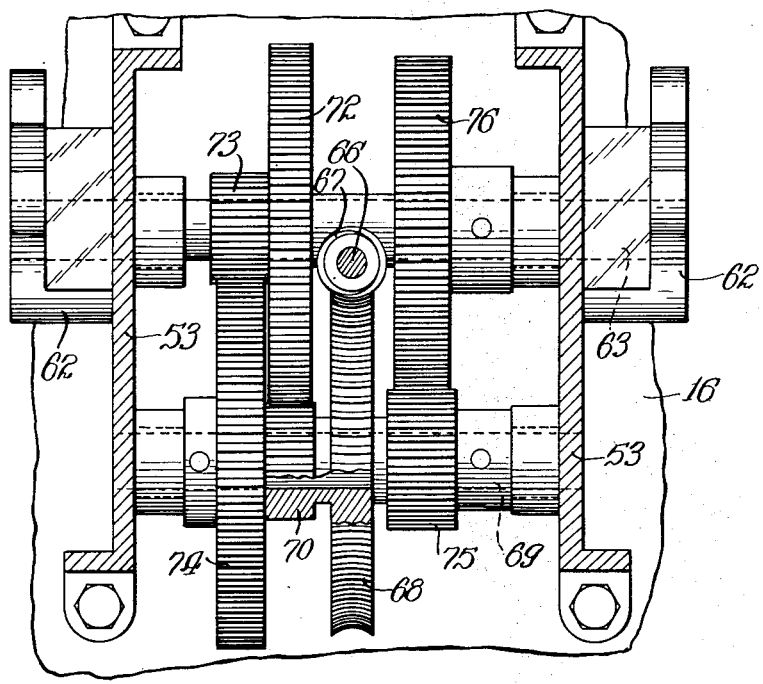
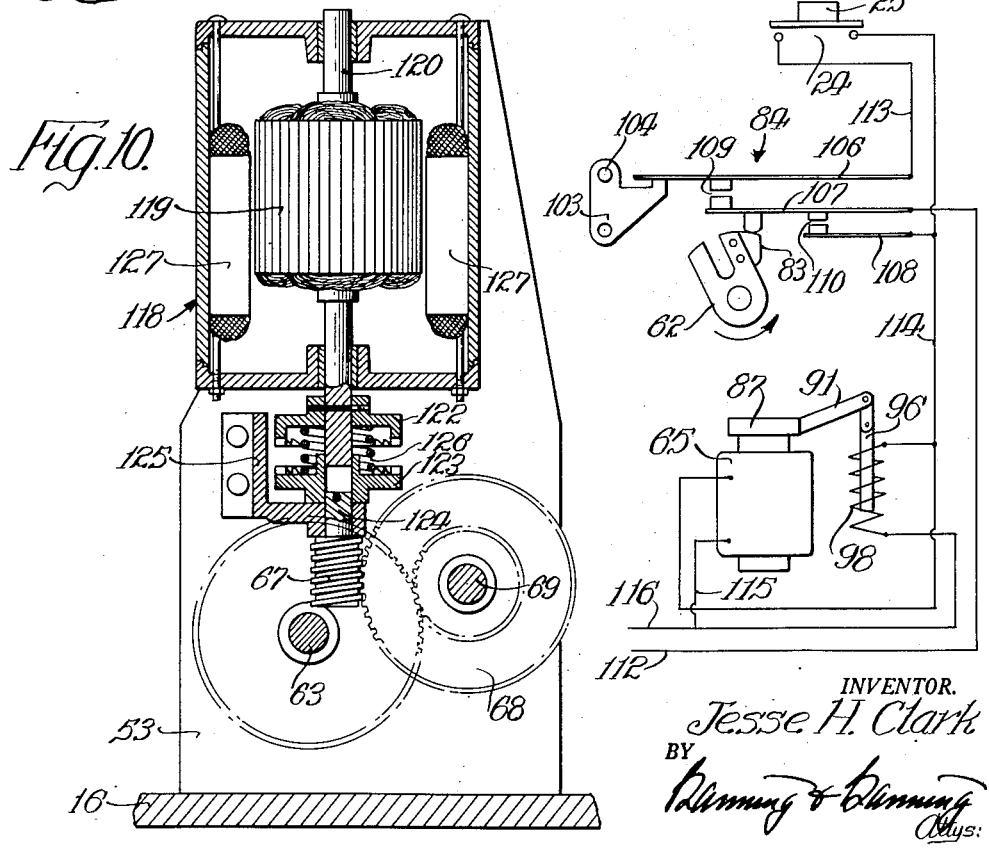
INVENTOR.
Jesse H. Clark
BY
Banning & Banning
Attys:

Patented Apr. 1, 1952

2,591,510

UNITED STATES PATENT OFFICE 2,591,510

CITRUS FRUIT PRESS

Jesse H. Clark, Chicago, Ill., assignor to Cory Corporation, Chicago, Ill., a corporation of Delaware Application March 25, 1949, Serial No. 83,413

12 Claims. (Cl. 100—40)

This invention has to do with a power-operated apparatus for expressing the juice from citrus fruits and the like. In particular the present apparatus is designed to meet the needs of restaurants and institutions serving large numbers of people, where speedy operation and substantially complete extraction of juice are important factors.

A major object of this invention is to provide a power-operated citrus juice press which will cut and press a whole fruit in a single continuous operation within a relatively short space of time, and which requires only a minimum of attention on the part of the operator.

Another object is to devise a machine of this character which may be produced to sell at a price to render its use economically feasible, and which, preferably, does not occupy an excessive amount of otherwise useful space.

A further object is to provide a power-operated citrus juice press which is simple to operate and substantially eliminates the possibility of injury to the operator.

Still another important object is to devise a power-operated machine in the nature of a citrus juice press which will not become stalled in event the fruit operated upon should offer excessive crushing resistance, or in event of some highly resistant foreign object being inadvertently lodged between the press jaws.

Another object is to devise simple power transmission means whereby a greatly increased mechanical advantage is afforded during the most heavily loaded portion of each cycle of operation, without increasing the time interval per cycle, thus making it possible to employ an inexpensive low-powered motor where it would otherwise be necessary to resort to a substantially larger and heavier motor involving added cost as well.

An additional object of this invention is to provide a citrus juice press wherein the expressed juice is effectively restrained during the pressing operation against ejection beyond the confines of the pressing area, thereby maintaining highly sanitary conditions and avoiding the necessity of cleaning the machine at excessively frequent intervals.

The various novel features of this invention will be disclosed in conjunction with the ensuing detailed description wherein reference is made to the accompanying drawings, wherein.

Figure 1:
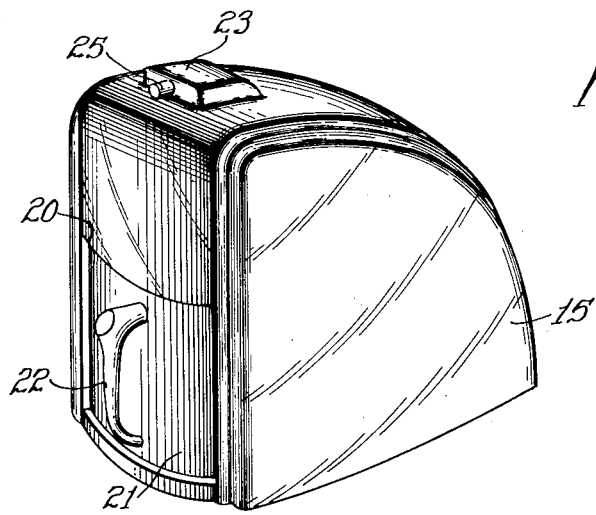
Figure 1 is a perspective view of the improved citrus juice extractor, and more particularly of the housing which encloses the working parts.
Figure 2:
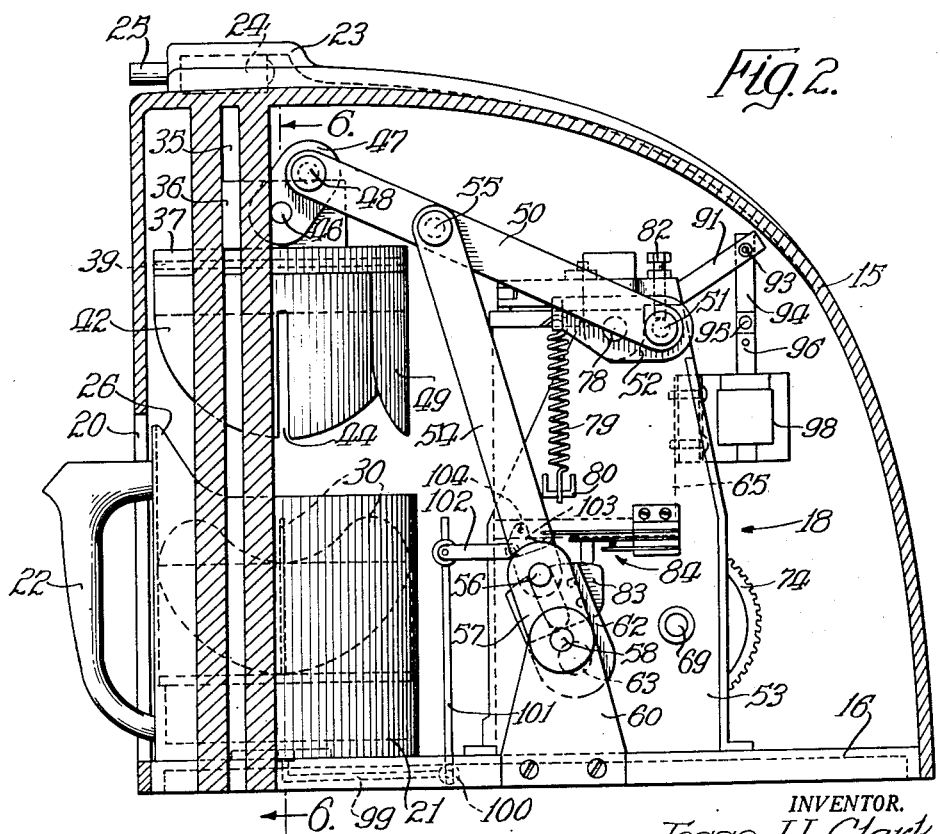
Fig. 2 is a vertical section through the housing, showing the mechanism in side elevation, various moving parts being shown in their open-press positions.
Figure 3:
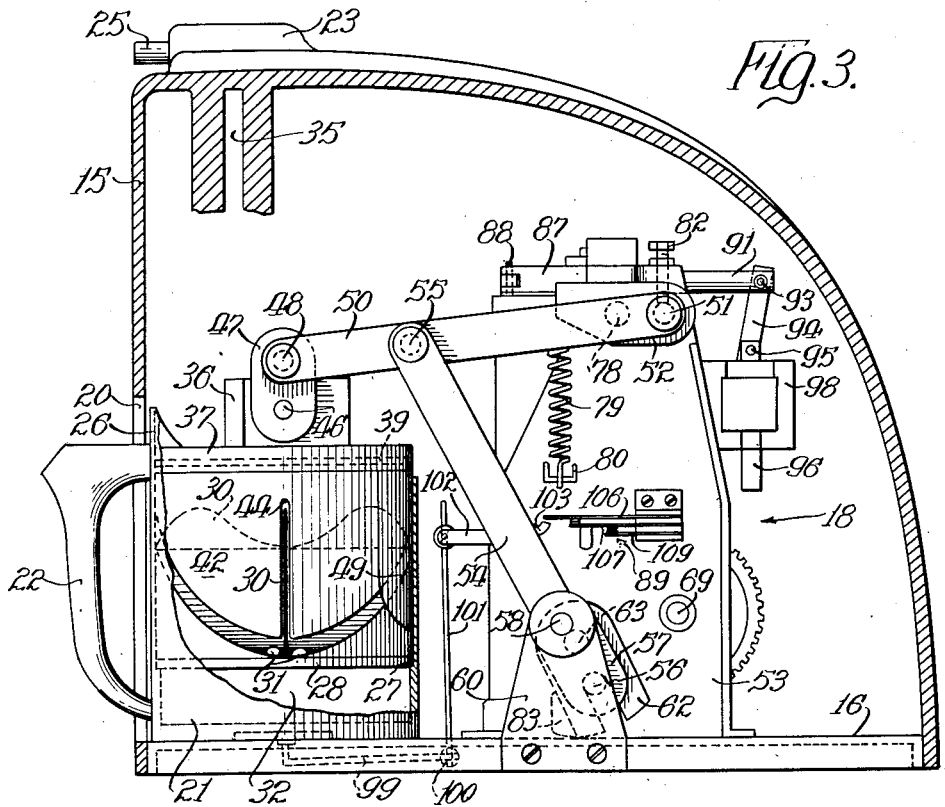
Figure 4:
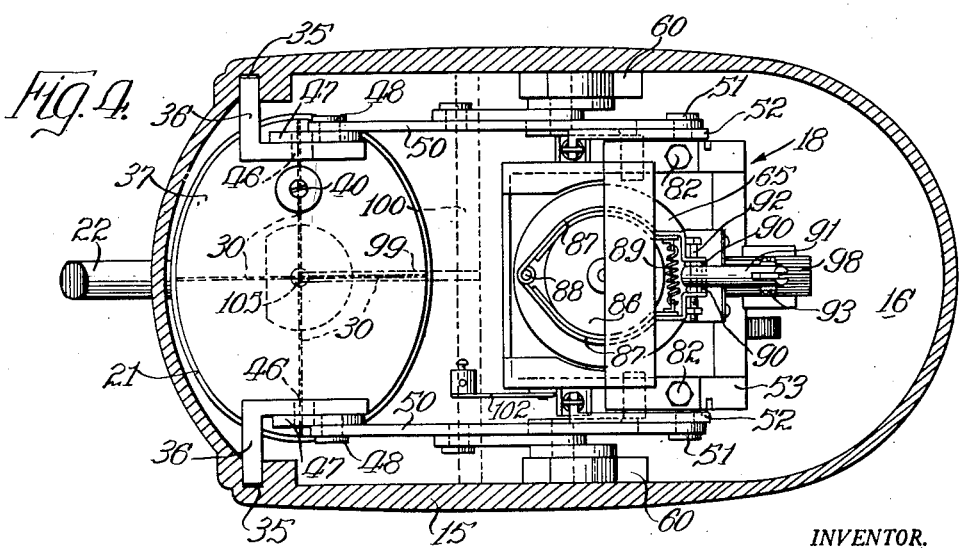

Fig. 3, which is a view similar to Fig. 2, shows the moving parts in their closed-press positions;

Fig. 4 is a plan view of the press mechanism and horizontal section of the housing;

Fig. 5 is a rear elevation of the press mechanism and vertical section of the housing;

Fig. 6 is a sectional view taken at line 6—6 of Fig. 2, showing details of the press jaws and the juice receptacle;

Fig. 7 is an enlarged showing of a detail of the power transmission mechanism;

Fig. 8 is an enlarged showing of the pressure-limiting arrangement which serves to prevent stalling whenever an inordinately heavy load is encountered;

Fig. 9 is an enlarged section at line 9—9 of Fig. 5, showing the transmission gears;

Fig. 10 is a vertical sectional view illustrating an alternative arrangement which eliminates the need of a brake for stopping the press at the end of each cycle; and Fig. 11 is a diagram of the motor control circuit.

The housing 15 preferably is a hollow die-casting overlying and attached to a rectangular bottom plate 16, forming both a bottom closure and a base-plate for the press mechanism, which latter is identified as a whole by reference numeral 18. An opening 20 is formed in the front wall of the housing for insertion and withdrawal of a cup-like receptacle 21 having a handle 22. A boss 23 integral with the top wall of the housing is designed to receive a starting switch 24 (see Fig. 11) having a pushbutton 25. It will be observed that the top wall of the housing curves downwardly to the rear, thus contributing to a very attractive design; and, as will presently appear, this is made possible without enlargement of over-all dimensions by a well-conceived design of the press mechanism per se.

The receptacle 21 has an internal annular ledge 27 (see Fig. 3) on which is removably seated a die-cast jaw-block 28 constituting the lower jaw of the press. This jaw-block 28 is formed with four upstanding cutter blades 30 arranged in quadrature. These may be either steel blades cast in place or of die-cast metal integral with the body of said jaw-block. The top surface 29 of the jaw-block 28 slopes downwardly in two opposite directions symmetrically from the center (see Fig. 6), and suitable openings 31 are provided at the bottom of each sloping top surface through which the expressed juice can flow into the chamber 32 at the bottom of the receptacle, underneath the jaw-block 28.

The housing 15 is formed with two opposed vertical guide slots 35 near the front thereof (see Figs. 2 and 4) in which are slidably disposed two oppositely projecting lugs 36 which are integrally cast parts of a vertically reciprocable ram 37 including a face plate 38 to which is detachably secured an upper jaw-block 42, preferably a diecasting. This upper jaw-block has a bottom surface 43 which slopes downwardly in opposite directions symmetrically from the center (see Fig. 6) to match the top surface 29 of the lower jaw-block 28; and said upper jaw-block is formed with four radial slots 44 disposed in quadrature and designed to admit the blades 30 so that the upper jaw-block can move downwardly to a sufficient extent to effect adequate compression of an orange or grapefruit disposed within the gap between the upper and lower jaw-blocks.

In order to confine within the receptacle 21 such juice as may be expelled upwardly and forcibly from the fruit under compression, it is desirable that the receptacle be provided with an upwardly extending apron 26, and that the upper jaw-block be provided with a depending apron 49 positioned to enter the receptacle 21 as the upper jaw-block descends. Said depending apron is, of course, slotted and cut away to the extent necessary to clear the lower jaw-block.

The face plate 38 of the ram 37 has a T-slot 39 extending thereacross and designed to receive a T-strip 45 constituting an integral part of the upper jaw-block 42. The T-strip 45, when interengaged with the T-slot 39, serves to secure the upper jaw-block 42 to the face plate 38 in such manner that the upper jaw-block can be detached from the ram and removed from the housing through the front opening 20 and be re-attached in like manner. A spring-pressed ball detent 46 (see Fig. 6) carried by the face plate 38 engages a recess in the top surface of the upper jaw-block 42 and serves to yieldably retain this upper jaw-block against unintentional displacement while at the same time enabling the jaw-block to be removed without too much resistance.

The two lugs 36 are of right-angular form, as viewed in Fig. 4, and to one leg of each there is pivotally connected at 46 one end of a short link 47 the other end of which is pivotally connected by means of a pin 48 to the distal end of a level 50 which is fulcrumed on a pin 51 attached to one end of a rocker 52 pivoted to a frame casting 53. It is to be noted that there are two each of the links 47, levers 50, and fulcrum pins 51.

The ram 37, together with the upper jaw-block 42, is normally held in its uppermost position (see Fig. 2) by links 47 and levers 50, which latter are supported by pitmans 54 which are pivotally connected thereto at 55.

The lower end of each pitman 54 is pivotally connected to a crankpin 56 carried by a crank arm 57 (see Fig. 5) and rotatable about a trunnion 58 carried by or journaled in an upright bracket 60 secured at its lower end to the bottom plate 16. The two crankpins 56 move concurrently through a circular orbit, one revolution per cycle of operation of the machine, starting from the position illustrated in Fig. 2 and at the completion of each cycle returning thereto to remain until the machine is re-started by depressing the starter button 25. It will at once be apparent that the reciprocatory motion imparted to the pitmans 54 is transmitted to the levers 50 and thence to the ram 37 via the links 47, and that the ram and upper jaw-block 42 are reciprocated vertically toward and away from the lower jaw-block 28.

In order to minimize the over-all time per cycle of operation and yet provide adequate pressure for squeezing the fruit, while at the same time making use of only a relatively small low-powered motor, the transmission about to be described is designed to vary the drive ratio so that increased mechanical advantage and the concomitant speed reduction obtains during only the fractional part of each cycle when maximum jaw pressure is required. The transmission includes two arms 62, 62 keyed to the respective ends of a horizontal power shaft 63 journaled in the frame 53, the axis of which shaft is offset laterally to a considerable extent from the axis of the trunnions 58. The two cranks 62 are each bifurcated, as most clearly shown in Fig. 7, to provide a radially extending slot 64 within each of which is positioned one of the two crank pins 56, individually.

It will be apparent from inspection of Fig. 7 that the center-to-center distance between the axis of the power shaft 63 and that of the crank pin 56 is a variable, due to the eccentricity of the shaft 63 with respect to the trunnion 58, and that the effective length of the arm 62 decreases as the crank pin 56 moves downwardly along its circular orbit from the stationary position in which it is shown in full lines in Fig. 7 to the intermediate position in which it is shown dotted in the same figure. Therefore, it will be apparent that as the ram 37 and the upper jaw-block 42 move downwardly, the speed thereof decreases, comparatively, and the mechanical advantage increases, so that the pressure capable of being engendered with the available power is greatly augmented. Otherwise expressed, enough pressure can be had with a low-powered motor to adequately squeeze the most resistant fruit without increasing the elapsed time per cycle over and above that which would otherwise obtain with a more costly motor of considerably greater power.

Driving power is obtained from a small fractional horsepower motor 65 mounted between the two sides of the frame casting 53 and supported thereby with its armature shaft 66 extending downwardly and provided with a worm 67 (see Figs. 9 and 10) which is affixed to said shaft and rotatable therewith. As shown most clearly in Fig. 9, the worm 67 is meshed with a worm wheel 68 which is freely rotatable on a shaft 69 and directly connected or integral with a small spur pinion 70. The latter pinion is, in turn, meshed with a gear 72 which is freely mounted on the power shaft 63 and is integral with a pinion 73 that is meshed with a gear 74 keyed or otherwise secured to the shaft 69; a pinion 75 is also keyed or otherwise secured to the shaft 69 and meshed with a gear 76 that is keyed to the power shaft 63. The several gears and pinions thus enumerated form a speed-reduction gear train between the motor 65 and the power shaft 63 which rotates at a speed corresponding to the predetermined cycle interval of the machine which may conveniently be of the order of five to eight seconds.

The rockers 52 to which the levers 50 are pivotally connected at 51 are carried by the frame casting 53 on which they are fulcrumed at 78; and the end of each said rockers remote from the fulcrum pin 51 is attached in each case to the upper end of a tension spring 79 the lower end of which is anchored to a bracket 80 supported by the frame 53. Obviously, the springs 79 bias their associated rockers 52 rotationally (counter clockwise as viewed in Figs. 2 and 3 and 7) and it will be noted that there are two stop screws 82 associated, individually, with the two rockers and which function as abutments for the fulcrum pins 51 and thus limit the extent of rotation of the rockers in the direction in which they are biased by said springs.

During each upstroke of the pitmans 54 the force acting on the levers 50 is such as to cause the fulcrum pins 51 to press upwardly against their stop screws 82; and the tension of the springs 79 is of sufficient magnitude so that the downward force exerted by the pitmans when an orange or grapefruit is being squeezed is not ordinarily enough to cause the rockers 52 to be rotated against the tension of said springs. But in event of some obstacle being encountered by the upper jaw-block such as would prevent completion of a downward stroke thereof, or such as would entail the need of more power than the motor is capable of delivering, the resultant downward force exerted through the levers 50 on the fulcrum pins 51 will overcome the tension of the springs 79, thereby causing the rockers 52 to rotate and the fulcrum pins 51 to move downwardly. Thus, the tensile force which must necessarily be exerted through the pitmans 54 and the corresponding momentary load which must be borne by the motor in order to complete any downward stroke of the pitmans 54 and crank pins 56 is limited by the tension of the springs 79. In other words, the maximum motor load is determined by the tension of the springs 79.

A cam plate 83 is secured to the rear face of one of the two cranks 62 and is revolved thereby in a circular orbit. This cam plate is operatively associated with a group 84 of contact springs and is adapted to actuate said springs in a way which will later be described with reference to the circuit diagram of Fig. 11. It will suffice at this point to note that the function of the cam 83 is to stop the machine at the completion of each cycle with the upper jaw-block 42 in fully elevated position, as shown in Fig. 2.

The upper end of the armature shaft of motor 65 carries a brake drum 86 (see Fig. 4) with which is associated a pair of brake shoes 87 hinged at 88 and biased by a spring 89 toward engagement with the brake drum. Each of the two brake shoes has an inclined surface 90 at its free end (see Fig. 5) and these surfaces are arranged to be engaged and forced apart against the tension of the spring 89 by a lever 91 one end of which is fulcrumed on a bolt 92 which extends through opposite openings in the free end portions of the brake shoes 87, as shown in Fig. 4. The other end of the lever 91 is pivotally connected at 93 to a link 94 (see Fig. 3) which, in turn, is pivotally connected at 95 to the upper end of the plunger armature 96 of an electromagnetic solenoid 98, the latter being attached to and supported by the motor housing. Energization of the solenoid 98 is effective to rotate the lever 91 downwardly, as per Fig. 3, thus causing the brake shoes 87 to be spread apart, thereby disengaging the brake drum 86. Conversely, deenergization of the solenoid is effective to release the lever 91, as the lever 91 is forced upwardly together with the link 94 and the plunger 96, whereupon the brake shoes are drawn into engagement with the brake drum by the spring 89.

To prevent the machine being set into operation when the receptacle 21 is not in place within the housing, there is provided a linkage operative in response to the presence of the receptacle within the housing to effect closure of a pair of contacts in the motor-starting circuit and, conversely, to effect opening of these contacts whenever the receptacle is not in place. This linkage includes an arm 99 located on the under side of the bottom plate 16 and attached at one end to a rocker shaft 100, while its free end is bent upwardly to provide a finger 97 which extends into an opening in said bottom plate to engage a boss 105 depending thereinto from the bottom of the receptacle. The top of the finger when rocked to its upper limit remains depressed below the upper face of the bottom plate 16 so as to be positioned therebelow and beyond contact from the hand of an operator who is using the machine. The rocker shaft 100 is journaled at its two ends in the two side flanges of the bottom plate 16, and fixedly attached thereto is a vertical arm 101 which, in turn, is pivotally connected at its upper end to one end of a link 102, the other end of which link is pivotally connected to a bellcrank 103 fulcrumed at 104 on the frame casting 53. A spring (not shown) biases the rocker shaft 100 clockwise, as viewed in Figs. 2 and 3.

Referring to Fig. 11, the group 84 comprises contact springs 106, 107, and 108. The contact springs 106 and 107 are so mutually adjusted that their contacts 109 are normally closed, i. e., these contacts 109 are closed when not held out of contact by the bellcrank 103 acting on the contact spring 106. The contact springs 107 and 108 are also so mutually adjusted that their contacts 110 are normally closed, i. e., these contacts 110 are closed when not held out of contact by reason of the spring 107 being deflected upwardly away from the spring 108 by the cam plate 83. The condition depicted in Fig. 11 is that which obtains when the machine is at rest and the receptacle 21 has been withdrawn from the housing. Tracing the circuit of Fig. 11, it will be seen that the power supply to the motor 65 and the winding of the solenoid 98 is interrupted at the contacts of the starting switch 24 and at the contacts 109. Hence, the motor is at a standstill and the brake is applied. If, under the condition stated, the contacts of the starting switch 24 are closed, nothing will happen because the contacts 109 are still open. But, if, on the other hand, the contacts 109 are closed by virtue of the receptacle 21 being emplaced within the housing, closure of the contacts of the starting switch 24 will complete a circuit from the power lead 112 through the contact spring 107, contacts 109, contact spring 106, conductor 113, the contacts of the switch 24, conductor 114, motor 65 and the conductor 115 to the other power lead 116. And at the same time a parallel circuit will be closed through the winding of the solenoid 98 from the live conductor 114 to the power lead 116. The brake will thereupon be released and the motor will start. The consequent rotation of the cam 83 from the position in which it is shown in Fig. 11 will result in almost immediate release of the contact spring 107, whereupon the contacts 110 will close. This affords an alternate path through the contacts 110 from the power lead 112 to the conductor 114 by virtue of which the motor and the solenoid continue to be energized to the end of the machine cycle, i. e., until the cam 83 returns to the starting position (see Fig. 11) and re-opens the contacts 110. When that occurs, both the motor and solenoid are deenergized, and the brake is instantly applied to bring the machine to an abrupt stop, with the upper jaw-block 42 in its uppermost position (see Fig. 2).

The procedure in operating the machine consists, quite obviously, in withdrawing the receptacle 21, placing therein a whole orange or grapefruit, which is supported and centered on the cutter blades 30, replacing the receptacle within the housing so that the cutter blades 30 line up with the slots 44 in the upper jaw-block, and then pressing the starter pushbutton 25. The machine thereupon goes through its cycle of operation, after which the receptacle is withdrawn for removal of the crushed fruit and expressed juice. The lower jaw-block ordinarily is lifted out of the receptacle to facilitate removal of the crushed fruit and effusion of the juice.

In Fig. 10 there is shown an alternative arrangement which avoids the need for the above-described brake and brake-releasing solenoid. In this instance the motor 118 is substituted in place of the previously-identified motor 65, and its armature 119 and armature shaft 120 are reciprocable axiswise in the motor bearings, as well as being rotatable in the usual manner. The lower end of the armature shaft 120 carries a toothed clutch member 122 which is engageable with a similarly toothed driven clutch member 123 in axial alignment therewith and pinned to a shaft 124 journaled in a bracket 125 and keyed to the previously mentioned worm 67. Interposed between the two clutch members 122 and 123 is a helical compression spring 126 biasing upwardly the assembly comprising the armature 119, armature shaft 120 and clutch member 122. In this position the armature is off-center with respect to the associated field poles 127. When the motor 118 is not energized, this assembly is held by the spring 126 in the elevated off-center position in which it is shown and the clutch members are accordingly disengaged. But upon being energized the armature 119 immediately centers itself axiswise with respect to the field poles 127 which results in the armature shaft 120 and clutch member 122 being moved downwardly and the clutch being engaged.

The rapidly revolving armature has so much momentum that if continuously coupled to the remainder of the machine a brake is required to stop the machine before it can overrun sufficiently to effect reclosure of the contacts 110; but with the motor disconnected the machine will stop promptly because of the friction involved.

It will be observed that the present apparatus provides a citrus juice press which is particularly suitable for restaurant service and the like, in which the necessary power is afforded by a small low-cost motor without sacrificing speed, and wherein novel means is provided to prevent the machine's being stalled in event of an overly-resistant piece of fruit or foreign objects being encountered by the press jaws. And it will further be observed that the mechanical assemblage has been so conceived and embodied that it will fit within a housing of relatively small over-all dimensions, and of a configuration consistent with modern ideas of product design.

I claim:

1. The combination, in a press for citrus fruits and the like, of a stationary jaw, a vertically reciprocable jaw disposed above the stationary jaw, a lever connected at one end to the reciprocable jaw and fulcrumed at the other end for reciprocation in a vertical plane, a pitman pivotally connected at one end to the lever, a crank having a crank pin radially spaced from the axis of rotation of the crank and revolvable in a circular orbit, the other end of the pitman being pivotally connected to the crank pin and movable therewith in said circular orbit, a power shaft having its axis of rotation parallel to the axis of rotation of the crank but laterally displaced therefrom, an arm co-axial with and rotatable by the power shaft and extending radially therefrom, the arm having a radially extending slot engaging the crank pin, the crank pin being movable lengthwise of the slot as it traverses said orbit, and power means for rotating the power shaft, the lateral displacement between the axis of rotation of the power shaft and the axis of rotation of the crank being so directed that the axis of the crank pin, extended, approaches a predetermined minimum lateral separation thereof from the axis of rotation, extended, of said arm while the reciprocable jaw approaches the stationary jaw, the predetermined minimum lateral separation being reached approximately concurrently with the end of each downward movement of the reciprocable jaw.

2. The combination according to claim 1, including a yieldable overload-responsive element operative to limit the load on the crank pin and thus effective to enable the crank pin to complete a cycle of operation notwithstanding the existence of an extraordinary impediment to downward travel of the reciprocable jaw.

3. The combination according to claim 2 wherein the overload-responsive element comprises a spring normally restraining the fulcrumed end of the lever against downward displacement but yieldable to permit downward displacement of the lever-fulcrumed end whenever the load exceeds a predetermined limit.

4. The combination, in a press for citrus fruits and the like, of a stationary jaw, a vertically reciprocable jaw disposed above the stationary jaw, a lever connected at one end to the reciprocable jaw and reciprocable in a vertical plane about a fulcrum located remotely from the reciprocable jaw, the lever being movable transversely of its length at its fulcrum, abutment means for limiting the transverse movement of the lever in one direction, at its fulcrum, a spring biasing the lever toward the abutment means, and power means for actuating the lever to effect reciprocation of the reciprocable jaw, the spring being yieldable to permit downward movement of the lever at its fulcrum in response to an actuating force applied to the lever in excess of a predetermined magnitude.

5. The combination, in a press for citrus fruits and the like, of a stationary jaw, a vertically reciprocable jaw disposed above the stationary jaw, a lever connected at one end to the reciprocable jaw and reciprocable in a vertical plane, a fulcrum pin for the lever, a rocker reciprocable in a vertical plane, the fulcrum pin being carried by the rocker at a point remote from the center of rotation of the rocker, a spring biasing the rocker in one direction, abutment means for limiting the degree of rotation of the rocker in the direction in which it is biased by the spring, a pitman connected to the lever for reciprocating the same and thus reciprocating the reciprocable jaw, and power means for actuating the pitman, the rocker being rotatable against the spring to permit downward movement of the lever at its fulcrum point in response to a force applied to the lever by the pitman in excess of a predetermined magnitude and in the direction corresponding to downward movement of the reciprocable jaw.

6. The combination according to claim 5 wherein the power means includes a crank, a crank pin carried by the crank and revolvable in a circular orbit, the pitman being connected to the crank pin at a point remote from its connection to the lever, a power shaft having its axis of rotation parallel to the axis of rotation of the crank and laterally displaced therefrom in a certain direction, and an arm carried by and extending laterally from the power shaft, the arm having a radially extending slot engaging the crank pin, said certain direction being such that the radial distance between the axis of rotation of the arm and the axis of the crank pin is a minimum at or near the lower end of the stroke of the reciprocable jaw.

7. The combination, in a press for citrus fruits and the like, of a removable juice-holding receptacle having a bottom and upstanding walls and provided above the bottom with horizontal supporting means, a stationary jaw arranged within the receptacle upon said supporting means and having top surfaces sloping downwardly in two opposite directions from the center where they intersect, four cutter blades arranged in quadrature and projecting upwardly from the stationary jaw and supported thereby, the blades being shaped to form, conjointly, a nest located above the intersection of the sloping surfaces of the stationary jaw for holding and centering an orange or other citrus fruit, a vertically reciprocable jaw disposed above and co-operable with the stationary jaw, the reciprocable jaw having a bottom surface complementary to the top surface of the stationary jaw and having four slots arranged in quadrature for reception of the cutter blades individually, and power means for reciprocating the reciprocable jaw.

8. The combination, in a press for citrus fruits and the like, of a housing having a pair of opposed vertical guideways, a stationary jaw positioned between the guideways, a ram reciprocable vertically along the guideways, the ram including a face plate, a reciprocable jaw carried by the face plate and movable with the ram toward and away from the stationary jaw, the jaws being operative, conjointly, to compress a whole citrus fruit therebetween, a pair of parallel laterally spaced levers, each pivotally connected at one end to the ram and each fulcrumed at the other end, a pair of pitmans, each pivotally connected at one end to an intermediate point of one of the levers, individually, and extending downwardly from the levers, a pair of cranks, each having a crank pin pivotally connected to the lower end of one of the pitmans and revolvable in a circular orbit, an arm having an axis of rotation perpendicular to the plane of said orbit and laterally offset from the axis of rotation of the crank, the arm engaging the crank pin and operative to revolve the same through said orbit, and power-driven means for rotating the arm, the crankpin being free to move relatively to the arm toward and away from the axis of rotation of the arm.

9. The combination according to claim 8 in which the housing is provided in one of its walls with an opening and includes a receptacle in which the stationary jaw is removably mounted, the receptacle, together with the stationary jaw, being withdrawable from the housing through the opening thereof.

10. The combination, in a press for citrus fruits and the like, of a stationary jaw, a vertically reciprocable jaw disposed above the stationary jaw, a lever connected at one end to the reciprocable jaw and fulcrumed at the other end for reciprocation in a vertical plane, a pitman pivotally connected at one end to the lever, a crank having a crank pin radially spaced from the axis of rotation of the crank and revolvable in a circular orbit, the other end of the pitman being pivotally connected to the crank pin and movable therewith in said circular orbit, a power shaft having its axis of rotation parallel to the axis of rotation of the crank but laterally displaced therefrom, an arm co-axial with and rotatable by the power shaft and extending radially therefrom, the arm having a radially extending slot engaging the crank pin, the crank pin being movable lengthwise of the slot as it traverses said orbit, power means for rotating the power shaft, the lateral displacement between the axis of rotation of the power shaft and the axis of rotation of the crank being so directed that the axis of the crank pin, extended, approaches a predetermined minimum lateral separation thereof from the axis of rotation, extended, of said arm while the reciprocable jaw approaches the stationary jaw, the predetermined minimum lateral separation being reached approximately concurrently with the end of each downward movement of the reciprocable jaw, and an overload-responsive element comprising a spring normally restraining the fulcrumed end of the lever against downward displacement and yieldable to permit downward displacement of the lever-fulcrumed end whenever the load exceeds a predetermined limit.

11. The combination with a power-operated press for citrus fruits and the like having a reciprocable ram, of a cam rotatable synchronously with the operation of the press through one cycle of operation of the press, an electric motor for driving the press, an energizing circuit for the motor including a switch, the cam being operable to open the switch in response to each return of the ram to its at-rest position, and further operative to effect closure of the switch immediately following the commencement of each cycle of operation of the press, a normally open manually operable switch in shunt to the terminals of the first-mentioned switch, and a third switch in series with the manually operable switch and in shunt through the manually operable switch with the first-mentioned switch, the press further including a removable receptacle adapted to be positioned beneath the ram while the press is in operation, and mechanism normally operative to hold the third switch open when the receptacle is not emplaced beneath the ram, the mechanism being operative in response to the weight of the receptacle when the latter is emplaced, as beforesaid, to close the third switch.

12. The combination with a power-operated press for citrus fruits and the like having a reciprocable ram, of a cam rotatable synchronously with the operation of the press through one cycle of operation of the press, an electric motor for driving the press, an energizing circuit for the motor including a switch, the cam being operable to open the switch in response to each return of the ram to its at-rest position, and further operative to effect closure of the switch immediately following the commencement of each cycle of operation of the press, a normally open manually operable switch in shunt to the terminals of the first-mentioned switch, and a third switch in series with the manually operable switch and in shunt through the manually operable switch with the first-mentioned switch, the press further including a removable receptacle adapted to be positioned beneath the ram while the press is in operation, mechanism normally operative to hold the third switch open when the receptacle is not emplaced beneath the ram, the mechanism being operative in response to the weight of the receptacle when the latter is emplaced, as beforesaid, to close the third switch, a brake effective to stop the motor when applied, and an electromagnetic solenoid connected with the brake and operative, when energized, to release the brake, the windings of the solenoid being arranged to be energized and de-energized concurrently with the motor.

JESSE H. CLARK.

REFERENCES CITED

The following references are of record in the file of this patent:

UNITED STATES PATENTS

| Number | Name | Date |
|---|---|---|
| 172,505 | Sammis | Jan. 18, 1876 |
| 587,860 | Redmon | Aug. 10, 1897 |
| 1,939,556 | Kammer | Dec. 12, 1933 |
| 2,003,299 | Marlowe | June 4, 1935 |
| 2,018,932 | Thorne | Oct. 29, 1935 |
| 2,131,440 | Johnson | Sept. 27, 1938 |
| 2,168,430 | Meyers | Aug. 8, 1939 |
| 2,363,798 | McCulloch | Nov. 28, 1944 |
| 2,373,736 | Arnot | Apr. 17, 1945 |
| 2,404,382 | Klein | July 23, 1946 |
| 2,413,866 | DuLaney | Jan. 7, 1947 |
| 2,451,733 | Hochwarder | Oct. 19, 1948 |
| 2,454,256 | Myers | Nov. 16, 1948 |
| 2,470,708 | LeWitt | May 17, 1949 |
| 2,534,554 | Kahre | Dec. 19, 1950 |
| 2,535,553 | Stoner | Dec. 26, 1950 |